United States Patent [19]

Melton

[11] Patent Number: 5,775,205
[45] Date of Patent: Jul. 7, 1998

[54] INFUSER UNIT FOR BEVERAGES

[76] Inventor: Bruce W. Melton, 21 E. Walnut, Hinsdale, Ill. 60521

[21] Appl. No.: 766,978

[22] Filed: Dec. 16, 1996

[51] Int. Cl.⁶ .......................... A47J 31/00; A47G 19/14
[52] U.S. Cl. ........................ 99/322; 99/279; 99/323
[58] Field of Search ......................... 99/319, 322, 323, 99/279; 220/521, 713, 501, 371, 372

[56] References Cited

U.S. PATENT DOCUMENTS

| | | |
|---|---|---|
| 370,141 | 9/1887 | Hobbs. |
| 1,777,909 | 10/1930 | Brookes ........................ 99/322 |
| 2,414,697 | 1/1947 | Pettersson ..................... 220/713 |
| 3,446,624 | 5/1969 | Luedtke. |
| 3,579,351 | 5/1971 | Wege et al.. |
| 3,631,793 | 1/1972 | Bednartz. |
| 4,074,827 | 2/1978 | Labe, III. |
| 4,443,481 | 4/1984 | Donarumma et al.. |
| 4,520,716 | 6/1985 | Hayes. |
| 4,577,080 | 3/1986 | Grossman. |
| 4,697,503 | 10/1987 | Okabe et al.. |
| 4,785,723 | 11/1988 | Sheen. |
| 4,867,993 | 9/1989 | Nordskog. |
| 5,168,140 | 12/1992 | Welker. |
| 5,363,745 | 11/1994 | Lin. |
| 5,424,083 | 6/1995 | Lozito. |
| 5,545,879 | 8/1996 | Brotz. |
| 5,678,472 | 10/1997 | Millman ........................ 99/279 |

*Primary Examiner*—Reginald L. Alexander
*Attorney, Agent, or Firm*—James T. FitzGibbon

[57] ABSTRACT

A disposable infuser for brewing beverages within an associated container. The infuser includes a well portion for receiving a charge of flavoring material positioning it below the upper rim but above the bottom wall of the container. A flexible is skirt dimensioned and contoured for removably gripping the container in liquid-tight relation, and an annular top panel extends between the gripping portion of the skirt and the well for offsetting the well from the outer wall of the container. The well portion is defined by downwardly extending, water permeable walls, and the drinking opening is formed in the top panel.

20 Claims, 4 Drawing Sheets

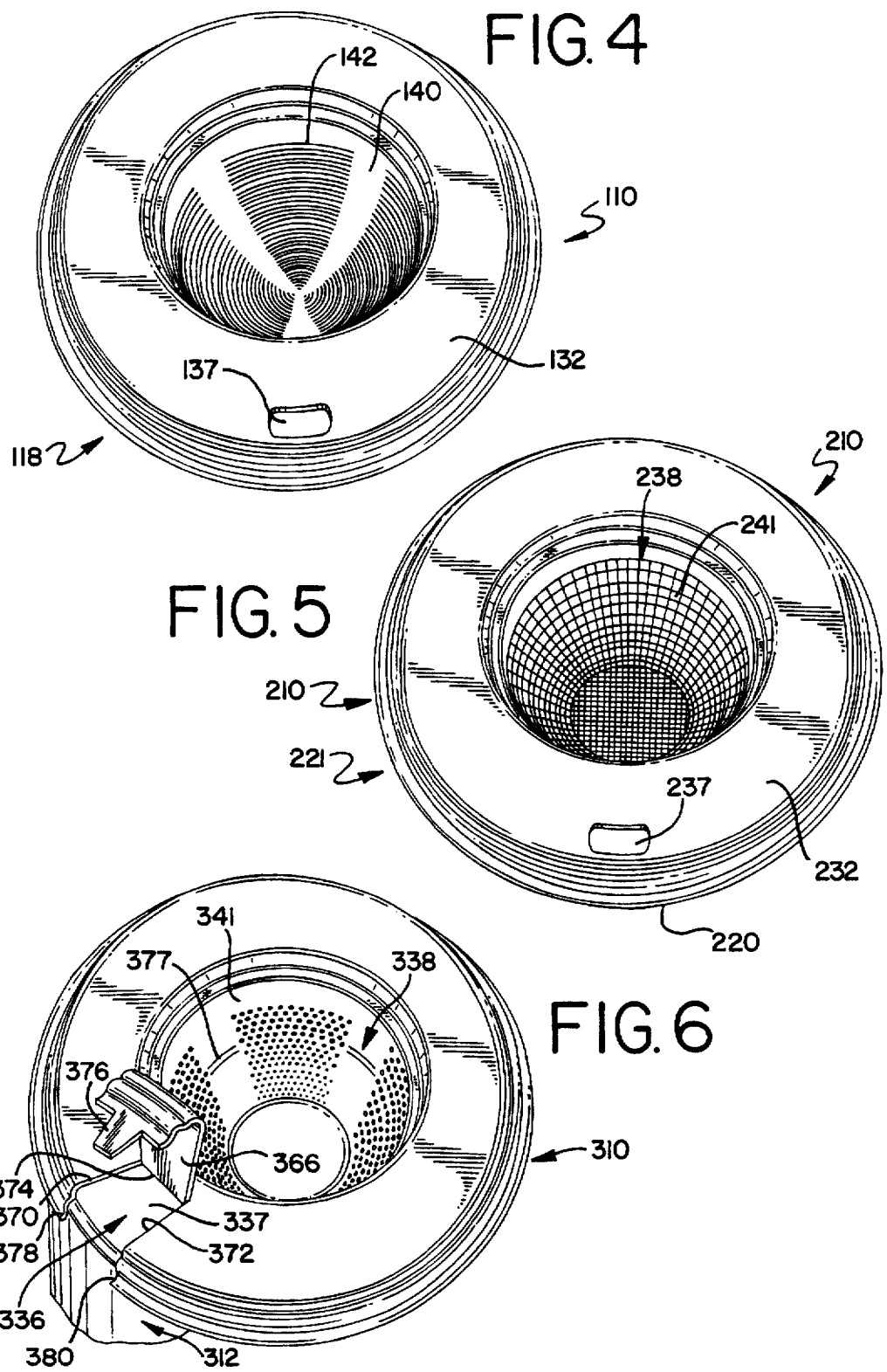

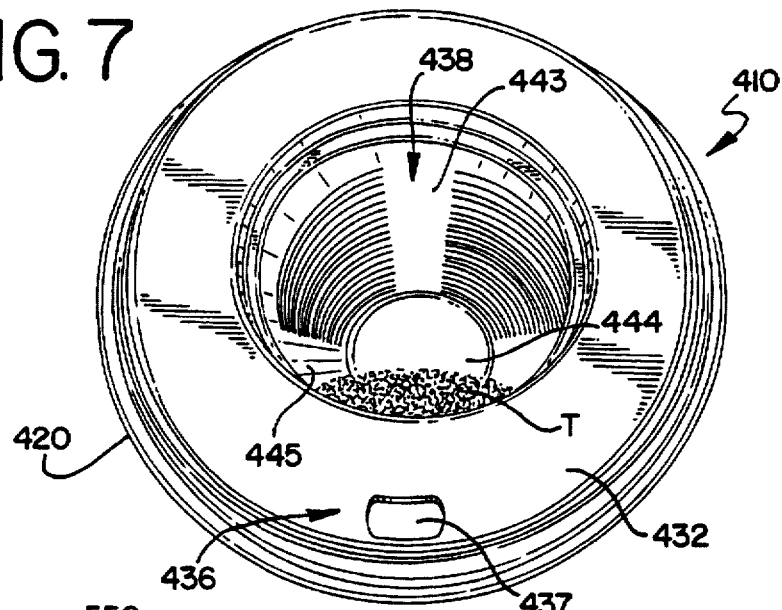
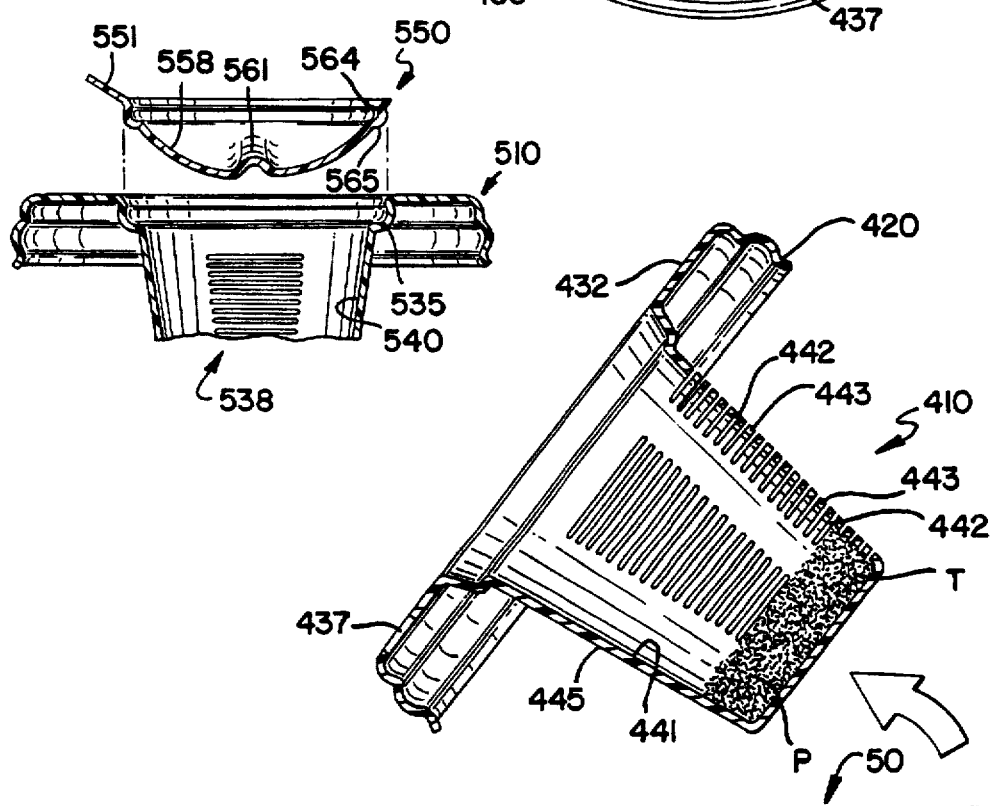
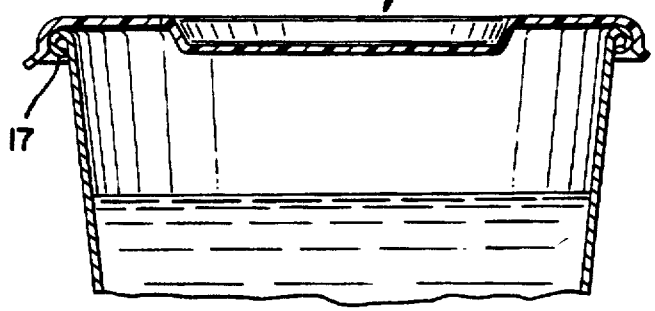

INFUSER UNIT FOR BEVERAGES

BACKGROUND OF THE INVENTION

The present invention relates generally to tea making and dispensing, and more particularly, to an infuser for making tea, "herbal teas," flavored coffees, and other steeped beverages. The infuser of the invention provides improved performance, convenience and other advantages in use, and is preferably a low-cost, disposable unit.

In recent years, there has been a rapid upsurge of interest in so-called gourmet coffee beverages. The numerous flavors and varieties of coffees have been heavily advertised and promoted. The public has become acquainted with specialty coffee shops serving a large variety of these products. Many so-called premium coffee shops receive high prices for their products, whether sold for on-premises or off-premises consumption.

Owing in part to the increasing saturation of the "gourmet" coffee market, and in response to a perceived need for lower-caffeine "healthy" beverages, there has been a growing interest in the consumption of teas and "herbal teas" (also known as "tisanes" and "infusions") in the United States. Worldwide, teas have a much longer tradition of acceptance than coffee and are consumed on a very widespread basis.

While tea brewing and consumption differ from coffee brewing and consumption in several important respects, the products and methods in other respects present similar problems, many of which are overcome by the present invention.

Prior to the advent of the tea bag, tea was customarily prepared by placing tea leaves in a pot, over which leaves near-boiling water was poured and steeped until a beverage of the desired strength was reached. In order to avoid the buildup of bitterness or other undesirable flavor, it was known to provide screens or strainers whereby the tea leaves could be confined for removal at a desired point in the brewing cycle. The use of strainers and the like, however, has the drawback of being relatively clumsy and inefficient from an equipment standpoint. Strainers require frequent cleaning and require the user to remove the strainer when the desired strength of beverage has been achieved. Strainers are also difficult to fill, seal, and to remove and store without dripping. Strainers are also often too small to allow sufficient circulation of water, particularly when using the highest quality "full leaf" teas.

While the tea bag addresses certain of the disadvantages with straining equipment, it too, has many disadvantages. Most bagged tea is of low quality, and the process of placing tea leaves in bags involves the crushing and breaking of the leaves, to the considerable detriment of flavor. The relatively small size and fine texture of the tea bag restricts the circulation of the leaves in the hot water, inhibiting rapid and full diffusion of the flavors into the body of the liquid. In addition, used tea bags, like the aforementioned strainers, create removal and disposal problems, particularly when the beverage is sold "to go" or on a "carry out" basis.

Another disadvantage of the tea bag is that it typically is available in one or two sizes only, effectively predetermining beverage strength for "carry out" products. Tea beverage strength is often varied by adjusting the proportion of water added to the leaves. However, for on-premises brewing of tea that is to be sold "to go," cup sizes are generally standardized and, consequently, strength variation is not easily achieved where the size of the tea bag is fixed.

Bagging tea also adds significant cost to the price of the beverage. Commonly, tea is enclosed in a bag (often, with an attached string and tab to facilitate removal); the bag is in turn placed in a paper or foil envelope or sleeve, and then the envelope or sleeve is placed in a box. The cost of these steps and/or materials is substantial. Moreover, tea bags are far more bulky per serving than "loose" teas, thereby increasing the costs of shipping, storing, and serving tea to consumers.

Another significant economic drawback of "bagging" tea is the cost of buying, maintaining, and operating expensive and specialized bagging equipment. Tea "co-packers" typically require minimum "run" quantities for a particular bag filling of 100,000 bags or more. A vendor's ability to commit to a wide variety of flavors in these quantities is considered prohibitively costly for all but the most established companies. Another difficulty with "co-packing" tea bags arises from the large scale, mass-production aspect of such bagging: there can be considerable delays in scheduling and completing production runs. Obviously, passing tea ingredients—many of which are imported—through middlemen such as co-packers and their distributors adds to the cost of the product, and the inherent delay may also compromise freshness and flavor.

Many tea drinkers are also acutely aware of environmental problems and, for such consumers, there is a negative reaction to bleached papers that are often used in tea bags. Moreover, the use of strings and staples to facilitate the removal of the bag at the desired point in the brewing cycle creates problems in the disposition of such products, including separating them from waste streams. "Stringless" tea bags are designed to address this problem, but they are clumsy for servers, who should, for sanitary reasons, use tongs to place the bag in a cup. Stringless bags also subject the user to certain risks and inconveniences in removing the bag at the desired point in the brewing cycle: often, stringless bags are plucked out of the hot tea with the user's bare fingers.

The foregoing disadvantages associated with tea bags are exacerbated when the beverage is sold "to go." The bag must be removed from the beverage between three and five minutes after purchase, typically too long to wait at the retail establishment and too soon before an appropriate receptacle for the dripping bag is located. Moreover, using a tea bag in a cup having a removable lid requires the user to open the lid in order to remove the bag, unless some sort of cumbersome bag receptacle is incorporated into the lid. The high temperature of the water creates a risk of injury if the cup is spilled while trying to remove the lid.

The foregoing aspects of the prior art practices argue strongly for using brewing methods other than those involving tea bags. However, the use of auxiliary equipment, including strainers, also creates difficulties in addition to the requirement that the equipment be manipulated after brewing and is hence unsuitable for take-out operations.

Referring now to the characteristics and advantages of bulk, "loose" tea as far as potential customer satisfaction and retailing profit are concerned, bulk tea is almost invariably perceived to be of higher quality than bagged tea. Bulk tea also requires less space per serving than bagged teas, for which allowance must be given for the waste space within the bag, and for the envelopes, sleeves, or boxes. Bulk tea is much more easily shipped and stored, and holds out the potential for saving a great amount of beverage preparation counterspace. In order to serve a popular market successfully, it is believed that a vendor should be able to offer at least three to four varieties of black tea, several varieties of green tea, a significant number of herbal teas and a number of flavoring enhancers or additives. These aggregate at least 10 to 20 varieties of teas and flavoring products, all of which are available at lower cost in bulk, "loose" form and which can be shipped and stored in much smaller containers. Moreover, bulk tea containers, such as jars, can be easily resealed to retain freshness.

Bulk, "loose" forms of herbal teas are also ideal because their leaves are more fragile than those of traditional teas, and hence less susceptible to bagging. Herbal teas are presently believed to be the fastest growing product in terms of tea market share.

A particular problem associated with bags of blended or mixed teas is shelf life. Because particular teas or herbs may go stale faster than the remainder of the bag contents, the shelf life of the entire product is tied to the shelf life of the least stable ingredient. If flavoring agents or flavoring augmenters were available that could be used with existing teas having longer shelf life, then the shelf lives of the composite products could be effectively extended without excessively burdening the inventory or stockkeeping process. Ensuring freshness of the entire beverage product and thereby maximizing flavor is always desirable, especially in a "gourmet" market.

In contrast to bagged teas, bulk or "loose" teas can be separately identified and kept in bins or jars from which the unique beverages can be custom blended "to taste" by each retailer to the order of a particular customer.

The growth of "herbal" teas which are of variable strength in relation to other teas, the growth of flavored teas, and the use of flavoring agents in tea such as spices and dried fruits, all argue strongly for having teas and their flavoring agents available in bulk quantities for custom blending "to taste" at the brewing site, especially for take-out customers. From the above, it is clear that a tea infuser of a proper design, i.e., a container for tea leaves in a cup or other brewing container, would serve many needs of tea retailers and consumers.

Besides tea, there are other hot beverages that can benefit from an infuser of proper design. For example, flavored coffees are quite popular, but must be made and served in quantity rather than to a customer's individual taste. Another example is the Asian hot milk based beverage known as "chai," whereby hot milk is flavored with cinnamon, pepper, ginger, crushed or shredded spices, herbs, and/or other flavoring agents. The use of a device that would enable such flavors to be added to hot milk on a custom basis would have a widespread appeal to chai fanciers, a rapidly-growing segment of the "gourmet" beverage market.

A properly-designed infuser would also facilitate the making of iced tea. An ideal situation would be to enable extremely hot water to be passed over a source of loose, fresh tea leaves custom-blended "to taste" in the infuser, sterilizing the leaves and extracting flavor almost instantaneously before being mixed with ice in the cup to achieve cooling. According to the invention, an infuser capable of simplifying the preparation and serving of iced tea is provided, and this infuser achieves other advantages as well.

Referring now to other advantages that might be gained by infusers of proper design, it would be advantageous if a permeable infuser could be made that would serve as a baffle below the surface of the liquid in the cup, thus preventing undesired "sloshing" of the beverage. Another advantage of an ideal infuser would be the ability to position tea leaves in such a way that, after the liquid level in the cup were lowered slightly, the strength of the beverage would not continue to increase, all without the risks of removing or repositioning the lid.

Still further, with products including coffee but primarily tea, wherein vapor phase flavor is inhaled by the user, a combination cover and infuser with an opening or recess to accommodate the nose of the user could favorably augment the apparent flavor of the product. In an ideal infuser, the wet, swollen, spent leaves might also serve as something analogous to a plug to augment the flavor of the liquid by sealing the container against loss of heat and volatile constituents.

Regarding the matter of serving tea for on-premises consumption or take out use, the so-called "gourmet" convenience coffee shops are confronted with difficulties not applicable to coffee. Thus, while a large pot of coffee can be brewed and many customers can be served from a common pot of large size, a principal advantage of tea is that the user may choose from a large number of flavors. This and the nature of the brewing process generally militate against keeping a large quantity of already-brewed tea on hand.

An ideal circumstance would be one wherein "loose" teas, "herbal" teas, and/or flavoring agents could be sanitarily placed in an exactly desired amount or proportion, as by a scoop or the like, into an infuser which could be associated with a cup into which extremely hot water could be added by passing over the leaves. This would enable the consumer to allow flavor to develop for the requisite time period and thereafter either remove the tea leaves and discard them without dripping, or lower the water/beverage level to isolate the tea from the water and thus terminate flavor build-up or change. Under further idealized conditions, the user could begin to sip the tea from the container for sampling purposes and thereby automatically remove the tea leaves from the liquid by lowering its level in the cup rather than by removing a bag or any auxiliary equipment.

In view of the failure of the prior art to provide a tea infuser having the above-described desirable characteristics, it is an object of the present invention to provide an improved infuser for tea or the like beverages.

Another object of the invention is to provide an infuser which is capable of being manufactured reliably at low cost.

Still another object of the invention is to provide an infuser which includes a perforated well or pocket, preferably centrally located, which can remain in place over the open top of a cup to seal the margins of the same, and which permits confining a charge of tea leaves to the well or pocket for infusion into the hot water, preferably as it is being poured over the tea leaves into the infuser well and thence into the cup.

A further object of the invention is to provide a combination infuser and beverage cup cover that will provide a drinking outlet area, a well for retaining tea leaves, and be of a configuration permitting the nose of the user to be accommodated while the container is tipped during sipping.

A still further object of the invention is to provide a disposable tea infuser of a design simplifying compact storage of large number of such infusers.

An additional object of the invention is to provide a beverage infuser of a type that is readily adaptable to mass production manufacture, and wherein the portion of the well receiving the tea may be made from any one of several materials, using a choice of methods.

A further object of the invention is to provide a low cost disposable infuser which permits ready retention and removal of tea leaves with the lid when desired, in a neat manner that will not create dripping problems such as those that arise in the use of a tea bag.

A still further object of the invention is to provide an apparatus which will simplify the formulation, brewing and serving of tea in retail establishments, with a view towards providing customer access to a variety of teas, and greater satisfaction to tea drinking customers.

The foregoing and other objects and advantages of the invention are achieved in practice by providing a disposable, low cost infuser for removable association with a drinking container wherein the infuser includes a body preferably having a container attachment portion such as a ribbed or beaded skirt, an upper, generally annular surface with a drink-through area in its outer margin, and further including a well or pocket portion with an open top, permeable walls extending sufficiently downwardly into an associated container so that the lower portions of the well lie initially below, and as the beverage is consumed, just above, the top surface of the liquid beverage.

The foregoing and other objects and advantages, including inherent objects and advantages, are also achieved in part by forming such a container from a plastic, foam, or waterproofed paper material in a stackable form, and with the infuser being constructed and arranged so as to accommodate an auxiliary lid or closure cap to facilitate transportation of the filled beverage cup and infuser without spillage in use.

The manner in which the foregoing and other objects and advantages are achieved in practice will become more clearly apparent when reference is made to the following detailed description of the preferred embodiments of the invention set forth by way of example and shown in the accompanying drawings wherein like reference numbers indicate corresponding parts throughout.

BRIEF DESCRIPTIONS OF THE DRAWINGS

FIG. 4 is a perspective view of one form of infuser made according to the invention and showing a well of generally conical form with narrow slots in the walls of the well portion;

FIG. 5 is a view similar to that of FIG. 4 but showing a well of frusto-conical shape with walls comprised of a fine mesh or woven material;

FIG. 6 is a view similar to that of FIGS. 4 and 5, but showing a cup with an infuser having a plurality of fine perforations in the well wall and a lift tab forming a drinking area in the outer margins of the infuser;

FIG. 7 is a view similar to that of FIGS. 4–6 but showing an embodiment of the invention wherein one sector of the circumference of the infuser pocket wall and the entire bottom wall are made from an imperforate material so as to minimize dripping when the infuser is removed from the cup;

FIG. 8 is a vertical sectional view showing the removal of the non-drip infuser for disposal and placing an auxiliary cover such as that shown in FIG. 2 over the container opening; and, FIG. 9 is a fragmentary vertical sectional view, on a reduced scale, showing a modified form of cover used with one style of infuser made according to the invention.

DESCRIPTION OF THE PREFERRED EMBODIMENTS OF THE INVENTION

While it will be understood that the invention may be embodied in somewhat different forms and that different materials may be used in the manufacturer of the preferred forms of product, a description will be given of a removable infuser which is intended for association with a disposable drinking cup of moderate capacity, such as 8–20 ounces, and wherein most or all of the infuser is made from a thermoformed sheet plastic material.

Figure 1:
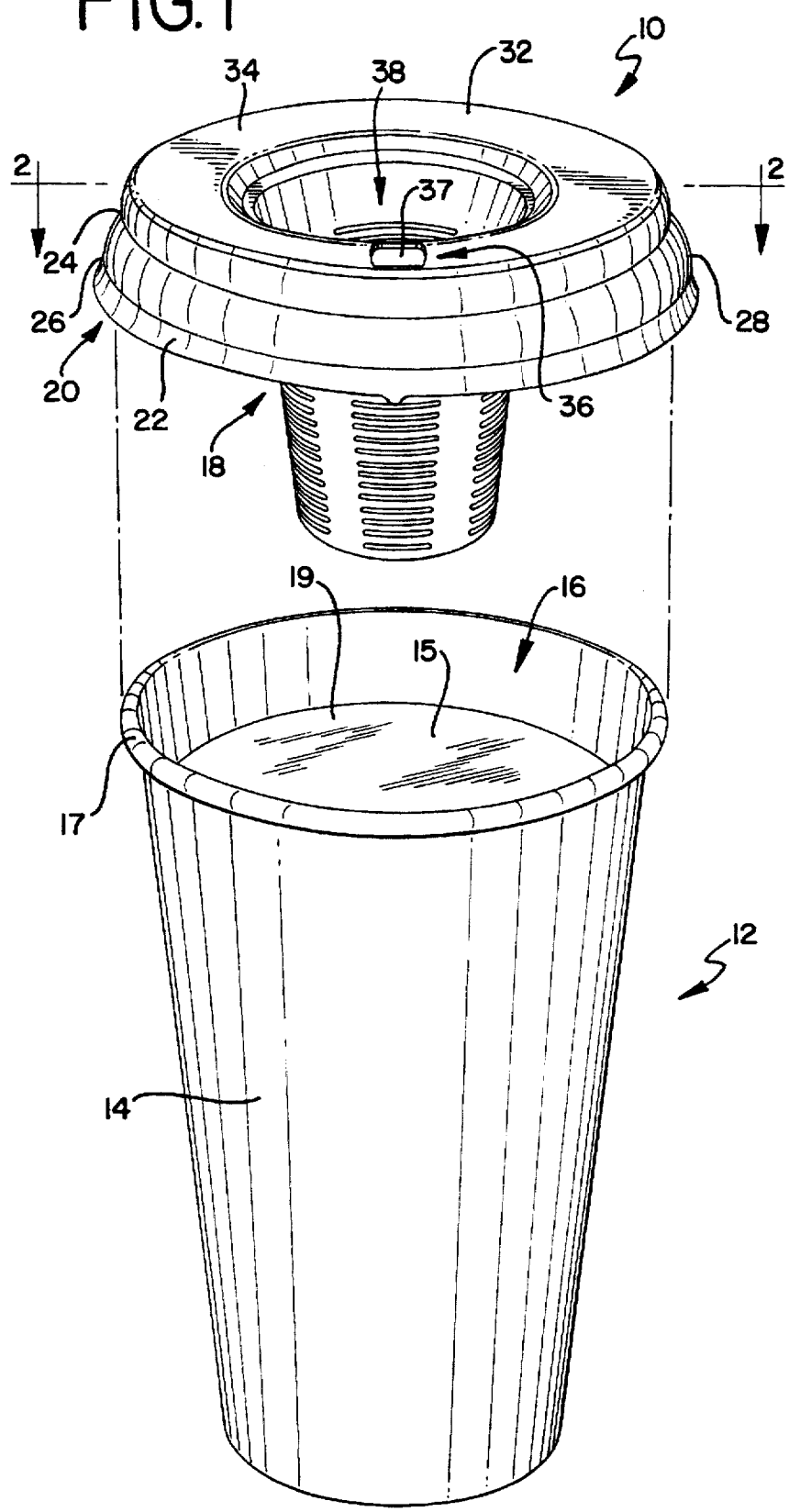
FIG. 1 is a perspective view of the infuser unit of the invention, showing it in exploded relation to a drinking cup filled with a liquid.
Figure 2:
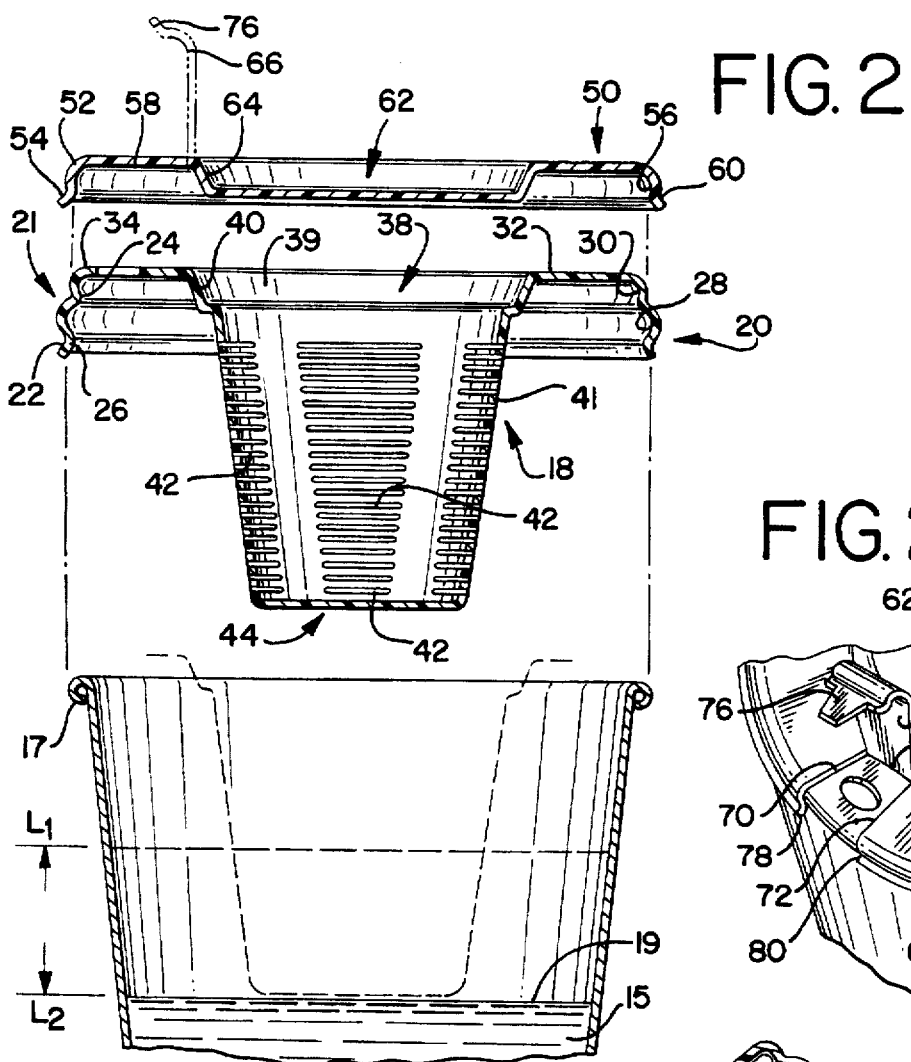
FIG. 2 is a fragmentary exploded vertical sectional view of the container, infuser, and one form of optional cover for the unit.
Figure 3:
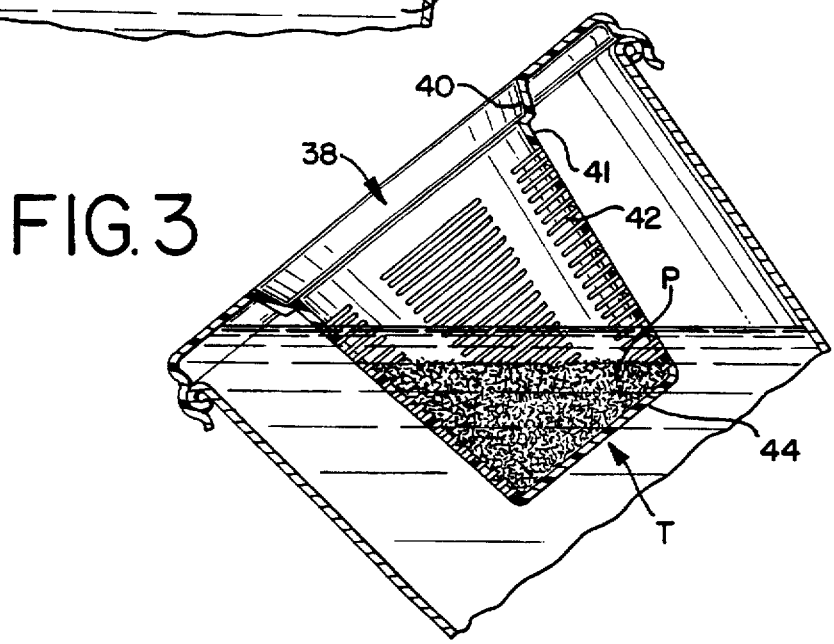
FIG. 3 is a vertical sectional view, similar to that of FIG. 2, but showing a plug of tea leaves formed in the well portion of the infuser to confine liquid flow to the opening in the drinking area as the cup is being used.

Referring now to the drawings in greater detail, FIGS. 1–3 show a low cost disposable infuser unit generally designated 10 of the invention to be removably associated with a cup or like drinking container generally designated 12 for liquid beverages. The container 12 includes rounded sidewall portions 14, an open top generally designated 16 defined in part by a rim 17, preferably in the form of a roll or curl formed in the top edge of the container 12. Liquid 15 is shown to have an upper surface 19 of a desired initial level. In one preferred embodiment, the container is made from a coated paper material for the best combination of stability, economy, and low heat transfer.

The infuser unit 10 is shown to comprise a one-piece body generally designated 18, including a radially outer skirt generally designated 20 and, as best shown in FIGS. 2 and 3, to include a container rim gripping portion generally designated 21, in this case comprised of a tapered bottom skirt flange 22, upper and lower beads 24, 26 defining therebetween a seating groove 28 adapted to engage the rim portion 17 of the container 12. The tapered bottom flange 22 serves as a pilot diameter portion for assistance in seating the infuser 10 on the container 12.

In one preferred form shown in FIGS. 1–3, a second inner groove 30 is defined between the upper bead 24 and an infuser body annular top surface panel generally designated 32. The annular top surface panel 32 includes a generally flat radially outer margin 34, forming a drinking area generally designated 36 including a preformed opening 37, preferably of ½ to ¾ inches in circumferential length and about ⅛ to ½ inch in width.

The infuser unit 10 also includes a well generally designated 38 for receiving a charge of tea ("T" in FIG. 3) or other products from which flavors may be extracted. The well 38 has a top opening generally designated 39 defined in part by a countersink wall portion 40 extending inwardly and downwardly from the inner margin of the annular top surface panel 32. A generally circular wall generally designated 41, and preferably of tapered form, extends downwardly from the countersink wall 40 into the cup interior to form the well 38. As shown, the walls 41 of the well 38 include portions with plural, spaced apart infusion openings 42 arranged in a geometric pattern.

If desired, the openings 42 may comprise plural slots in parallel array, or may be patterned or randomly disposed openings of various kinds, if desired. In the form shown in FIGS. 1–3, the well 38 is frusto-conical and includes a generally flat bottom wall 44.

The openings 42 are small enough to retain tea "T" and/or flavor enhancers in the well 38, but are large enough to allow water to readily enter the interior of the well 38 to infuse the water with the flavors extracted from a charge of tea "T" or other flavoring agent. The openings are also large enough to allow diffusion of sugar or cream into the water or other liquid beverage 15, and the well depth is such that the initial water level L₁ (FIG. 2) will be well below the container rim 17 but above most of the well 38 to allow cream or sugar to be added and mix readily with the water or other liquid being flavored.

As shown in FIG. 2, one optional feature is a provision of a removable infuser unit cover generally designated 50 and shown to include a cover skirt generally designated 52 having a tapered skirt flange 54 and a groove 56 lying between a cover top panel 58 and a bead 60 separating the flange 54 from the remainder of the skirt 52. The top panel 58 preferably includes a depressed center section generally designated 62 connected by a countersink cover wall 64 which is congruent with the countersink wall 40 in the infuser unit 10. The cover 50 is removably secured to the infuser 10 by cooperative interfitting of the cover groove 56 and the beaded outer surface of the groove 28 in the infuser.

Figure 2A:
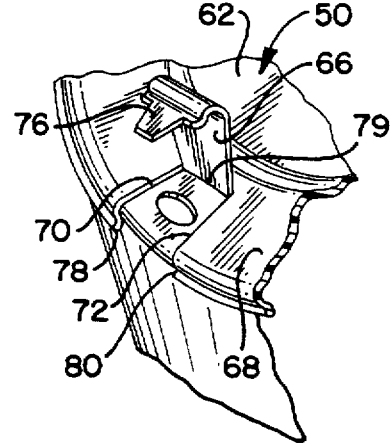
FIG. 2A is a fragmentary perspective view showing the cover of FIG. 2 in place over the infuser, with the drinking openings in registry with each other.

As illustrated in FIG. 2A, the infuser cover 50 is a separate piece that is used with a form of infuser 10 that has an opening 37 in its drinking area 36. The cover 50 has a lift-up tab in the form of a truncated sector 66 defined by lines of weakness 70, 72 extending radially inwardly toward a foldline 74 formed in the outer margin 68 of the cover 50. Optionally, the foldline could be formed within the depressed center section 62 of the cover 50. Preferably, the lift-up tab 66 includes a grasping extension 76, and there are notches 78, 80 forming areas of stress concentration wherein tearing along the lines of weakness 70, 72 may be initiated.

In this application, the cover 50 is snapped over the infuser after the water has been poured over the tea in the well. When it is time to sip the beverage, the extension 76 of the lift-up tab 66 is grasped and pulled up, exposing the opening 37 in the radially outer margin 34 of the infuser top panel 32. In the alternative, as shown in FIG. 8, the infuser 10 may be removed from the container 12 after use. Thereafter, the cover 50 may be placed on the rim 17 of the container 12 in liquid-tight relation. For reasons which will appear, these steps are optional. An optional form of cover is described elsewhere herein.

Referring now to FIGS. 4–6, several alternate forms of the infuser are shown. Referring first to FIG. 4, an infuser generally designated 110 is shown to be similar to its counterpart 10 in FIGS. 1–3, and to include an opening 137 placed in the drinking area of the panel 132 of the body 118. The principal differences in the embodiment of FIG. 4 and that of FIG. 1 is that the well walls 140 are shown to taper to a point, or nearly so at the bottom, i.e., the construction does not require a flat bottom wall to form the well 138. In addition, the slots 142 are shown as being narrower and more numerous than their counterparts in FIGS. 1–3.

FIG. 5 shows another modified embodiment of the infuser generally designated 210, and shown to include the opening 237 in the drinking area, i.e., a part of the annular panel 232. The rim gripping portion generally designated 221, including the beaded skirt 220, resembles its counterpart in FIGS. 1–3. In the embodiment of FIG. 5, however, instead of slots, the walls 241 of the well 238 comprise a fine mesh screen material. This permits the walls 241 and the bottom 244 of the well 238 to be liquid-permeable for permitting water to flow to and through the tea or other flavoring product.

FIG. 6 shows a further embodiment of the infuser generally designated 310 associated with a cup 312 and shown to have needle- or pin-perforated walls 341 forming the well 338. In this instance, the drinking area generally designated 336 includes a preformed opening 337 formable by a lift-up tab 366 defined by lines of weakness 370, 372 terminating adjacent a transverse foldline 374. The tab 366 preferably includes a grasping extension portion 376. The lines of weakness 370, 372 terminate at their radially outer ends in notches 378, 380 that serve as areas of stress concentration to initiate tearing. One optional feature is shown in FIG. 6, namely, a fill line or water level marker 377 embossed or printed in the sidewall 341. This aids the user or server in filling the container to a desired level, such as L₁ shown in FIG. 2.

It will be appreciated that the different wall configurations, drinking openings, etc. may be made in different combinations than those illustrated and thus the invention is susceptible to embodiment in various permutations and combinations.

Referring now to FIGS. 7 and 8, a still further embodiment of the infuser generally designated 410 is shown. Here, the illustrated form of infuser 410 includes the annular top surface panel 432, a well generally designated 438 and a drinking area 436 with the opening 437 formed therein, and the series of beads and grooves in the skirt portion 420 of the infuser 410. The slot-style openings 442 are also shown with solid spaces 443 between arrays of slot openings 442.

In this embodiment, the bottom wall 444 is shown as being imperforate, as is one circumferential portion 445 of the wall 441. As best shown in FIG. 8, this provides a non-drip feature if the infuser 410 titled toward the solid wall side as it is being is removed from the container 412.

While it will be understood that the infuser of the invention may be utilized in different ways, a description will now be given of the presently preferred manners of taking maximum advantage of the various features of the invention. In ordinary circumstances, one preferred form of brewing tea is to place a charge of tea "T" taken from a bulk source by a measuring spoon or the like (not shown) and insert the charge of tea "T" into the pocket or well portion 38, 438 of the infuser 10, 410. This may be done before or after the infuser 10 is associated with the container 12. Associating the infuser with the container is done by simply covering the rim 17 of the container 12 with the flange 22 on the infuser skirt 20 and pushing down until the rim 17 snaps into the seating groove 28.

Thereupon, and having reference to the level marker 377 of FIG. 6, for example, very hot water is poured over the tea leaves "T" in the pocket or well 38, 238, 338, etc. until the upper surface 19 of the water 15 in the container 12 is aligned with the initial or upper level mark 377.

Referring to FIG. 2, this would be at the initial level mark L₁, wherein the lower portion of the well or pocket is significantly beneath the top surface 19 of the water. Thereupon, flavors are extracted from the charge "T" by the water, and infused into the mass of water. This method has the advantage of directly contacting the tea leaves with the water when it is at its most elevated temperature. After allowing the beverage to steep for a moderate time, such as two to five minutes, the beverage may be sipped by tilting the container to the position of FIG. 3 and allowing the user to drink from the opening or port 37, 137, etc. If the cover unit 50 is in place, this may include lifting up the sector tab 66 to expose the opening 37 (FIG. 2A). In the embodiment of FIG. 6, the tab 366 is formed in the infuser 310 itself.

In practice, it has been found that the array or charge of wetted tea leaves "T" often effectively form a plug "P" (FIG. 3) within the pocket or well, confining the beverage against spillage from the well, and yet allowing the user to sip the beverage from the opening. In so doing, the liquid level in the container is lowered, less and less of the water 15 is in contact with the mass of tea, and when lower level $L_L$ (FIG. 3) is reached, further extraction or infusion ceases altogether and the beverage then simply retains the strength it then has. According to the invention, the plug "P" of expanded and wetted tea leaves in effect also serves as an insulating mass, so the effectively closed container will then maintain the beverage at a hot to warm temperature level for an extended period of time.

If it is desired to extend the time of drinking and further reduce heat transfer, optional steps are available. First, the removable cover 50 may be snapped in place over the infuser 10 as shown in the exploded view of FIG. 2, for example. This may be done before or after the water level has been lowered towards $L_2$, i.e., when the potential for increase in beverage strength has been eliminated. In this regard, an alternate method of controlling beverage strength or saturation is shown in FIG. 8, which should be viewed in connection with FIG. 2.

In FIG. 8, an infuser 410 containing an imperforate sidewall section 445 is shown to be removed, before or after the liquid level is lowered, but a measurable time after initial infusion. Preferably, when the tea has achieved the desired strength, the infuser 410 is removed and tilted to one side, whereby the combination of imperforate bottom wall 444 and sidewall sectors 445 prevents possible undesired from the saturated tea leaves contained in the well 438.

When the infuser 410 is removed, the lid 50 is placed over the container 12 for purposes of heat retention. Thereafter, drinking from the container is accomplished by removing the lid, or, as shown in FIGS. 2A or 6, by lifting the tab 66 to provide a drinking opening of the illustrated type.

Referring now to FIG. 9, one form of infuser 510 with an alternate form of well cover unit 550 is shown. In this illustration, it is understood that the infuser 510 is generally similar to the type shown in FIGS. 1–3, or that of FIGS. 4 through 8. However, unlike the cover 50 of the embodiments of FIGS. 2 and 8, the well cover 550 of FIG. 9 is a smaller diameter snap-in unit that includes an optional pull-tab 551 for easy removal, a well cover countersink wall portion 564 extending downwardly and terminating in a bead 565 of slightly enlarged diameter.

The main cover panel portion 558 of the well cover 550 is of a generally concave section, preferably and optionally having a center ridge portion 561 dividing the main panel into opposed half sections. The ridge 561 is contoured so that the cover may be grasped between the thumb and forefinger of a user for insertion into the infuser 510 as shown. In this connection, the infuser differs from its counterparts only in that its countersink wall 540 is somewhat more steeply inclined, and that a well cover-receiving annular groove 535 is also provided for cooperative retention of the bead 565 on the well cover 550.

The well portion 538 of the infuser 510 is understood to be generally similar to that of its counterparts although, for simplicity of illustration, it is shown with just a few representative slots or infusion openings 542. The function of the units is the same, except that the smaller cover unit 510 may reduce costs and provide a convenient way of covering only the top of the well portion for purposes of preventing spillage and heat retention during transport of the lidded container. Preferably, the well cover 510 is transparent.

In the preferred form of making iced tea, the cup or container 12 is filled with an appropriate quantity of ice and the tea is placed in the pocket 38 with the infuser in place. Thereupon, the hot water is slowly poured into the pocket or well for maximum extraction under conditions of direct water-tea contact. As the just-brewed tea enters the container and moves to the bottom, it contacts the ice and then achieves its lower temperature.

In the preferred form of infuser, the unit is made from a thermoformable plastic material such as a styrene-containing copolymer. Preferably, the thickness of the material as formed is about 0.010–0.015 inches. Depending on the forming method, the thickness may vary somewhat throughout the product. The choice of polymer used depends on the exact application, with those skilled in the art being aware of the requirements for flexibility, relatively easy tearability if a pull tab is present, overall stiffness and optionally, colorability. The ability to be embossed or imprinted with various legends, etc. can but need not be important. The openings in the sidewall of the well, whether circular, elongated slots or other formation are created in known ways, including the use of slitters, needle or contoured style punches, perforators or the like. The actual method of manufacture is not important to the success of the invention. The infuser skirt should be flexible enough to deform sufficiently that the rim gripping portions readily engage the curl on the top of a container and create a snug enough fit to be substantially liquid tight. In some cases, a non-plastic material such as paper or fabric may be used, or even metals of thin cross section may be employed. If the infuser is made from more than one material, such as if the well is preformed from a material other than that from which the rim-engaging portion is made, the separate portions may be adhered to each other by heat sealing, adhesives, crimping or other ways known to those skilled in the art.

It will thus be seen the present invention provides a new and improved hot beverage infuser having a number of advantages and characteristics, including those pointed out herein and others which are inherent in the invention. Several preferred embodiments having been described by way of illustration, it is anticipated that modifications to the described forms of product will occur to those skilled in the art and that such modification and changes may be made without departing from the spirit of the invention or the scope of the appended claims.

I claim:

1. An infuser unit for making beverages in an associated container from a material from which flavors are extracted at elevated temperatures, said infuser including a container attachment portion for removable association with the rim of an associated liquid container in snug, liquid-tight relation, an annular cover panel portion extending radially inwardly from said container attachment portion, a well portion for receiving a charge of flavoring material, said well portion being defined by walls extending downwardly from said cover panel portion and to a position substantially beneath said container attachment portion, whereby a portion of said well lies below the level of a liquid in said associated container, at least, a portion of said walls being liquid-permeable to permit water circulation between the regions lying respectively inside and outside said well to permit infusion of flavors from said flavoring materials to said liquid, a drinking area formed in a portion of said annular cover panel portion of said infuser, said drinking area including an opening having at least one portion lying radially inwardly of said container attachment portion.

2. An infuser unit as defined in claim 1, wherein said drinking opening is formed by a lift tab portion of said infuser unit, said lift tab portion being defined by spaced apart lines of weakness extending from the radially outer edge of said container attachment portion and toward said well portion.

3. An infuser unit as defined in claim 1, wherein said annular cover panel portion lies generally above said container attachment portion.

4. An infuser unit as defined in claim 1, wherein said drinking opening comprises a preformed opening lying at least partially within an outer margin of said annular cover panel portion.

5. An infuser unit as defined in claim 1, wherein said well walls include liquid impermeable wall portions, said impermeable portions being positioned to prevent dripping of liquid absorbed in said leaves through said well walls when said infuser is positioned with said impermeable portions at the bottom thereof.

6. An infuser unit as defined in claim 1, wherein said well is of frusto-conical configuration, and includes tapered sidewalls and a generally flat bottom wall portion.

7. An infuser unit as defined in claim 1, wherein said permeable walls are formed by plural, spaced apart slits in said well walls.

8. An infuser unit as defined in claim 5, wherein both said sidewall and said bottom wall portions are made from a liquid-permeable material.

9. An infuser unit as defined in claim 1, wherein at least a portion of said well wall includes plural pinhole perforations.

10. An infuser unit as defined in claim 1, wherein said well is of generally frusto-conical shape and includes an upper margin formed by an inner marginal frusto-conical surface adapted to receive a tapered seat portion as an associated cover.

11. An infuser unit as defined in claim 1, wherein said container attachment portion includes a skirt having a pair of radially inwardly directed, parallel beads spaced apart so as to define a seating groove therebetween.

12. An infuser unit for removable association with a liquid container, said infuser unit comprising, in combination, a container-gripping portion including a circumferential skirt portion, at least one groove formed in said skirt, said groove lying in a given plane and being dimensioned to contact a container rim in snug sealing engagement, a top panel portion having a generally flat, annular surface with a drinking opening formed in a portion of said surface, well-forming walls having their upper portions extending downwardly from the radially inner margin of said annular top surface, with said walls having lower portions extending substantially below said given plane and having a large plurality of closely spaced apart openings therein, said well further including an upwardly open central portion providing access to the interior of said well so as to permit addition thereto of flavoring materials from which flavors are extracted.

13. An infuser unit as defined in claim 12, wherein said well is arranged generally centrally of said top panel portion.

14. An infuser unit as defined in claim 1, wherein said infuser is made from a thermoformable plastic material.

15. An infuser unit as defined in claim 1, wherein said well portion further includes at least one mark visible on an interior surface of said well, said mark enabling a user to determine a water level within said associated container that will enable said charge of flavoring product to be covered by said water in said container.

16. An infuser unit as defined in claim 1, wherein said well portion of said infuser includes both liquid-impermeable and liquid-permeable wall portions, said impermeable portions preventing dripping of water when said infuser is removed from said container.

17. A low cost disposable infuser for brewing beverages within an associated container, said infuser comprising, in combination, a well portion for reception of a charge of flavoring material and for positioning said charge of material within an associated container substantially below the upper rim of said container but substantially above the bottom wall of said container, a portion including a flexible skirt dimensioned and contoured for removably gripping said associated container in liquid-tight relation, and an annular top panel extending between said gripping portion of said skirt and said well for offsetting said well from the outer wall of said container; said well portion being defined by downwardly extending, water permeable walls, and means defining a drinking area including an opening in said top panel portion.

18. An infuser as defined in claim 17, wherein said annular top panel, in use, lies above said container upper rim.

19. An infuser as defined in claim 17, wherein said means defining said drinking area comprises a preformed opening in said infuser lying within said top panel between said container gripping portion and said well portion.

20. An infuser as defined in claim 17, wherein said means defining said drinking area including an opening is formed by a pair of spaced apart lines of weakness in said container gripping portion of said top panel portion and defining therebetween a lift tab portion of said infuser that may be removed from said infuser to form said drinking opening.

* * * * *